United States Patent
Marschke et al.

(10) Patent No.: US 10,835,983 B2
(45) Date of Patent: Nov. 17, 2020

(54) ELECTRODE NEGATIVE PULSE WELDING SYSTEM AND METHOD

(71) Applicant: Illinois Tool Works Inc., Glenview, IL (US)

(72) Inventors: Bryan Dustin Marschke, Kimberly, WI (US); Amanda Jean D'Arcy, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 347 days.

(21) Appl. No.: 13/828,040

(22) Filed: Mar. 14, 2013

(65) Prior Publication Data
US 2014/0263243 A1    Sep. 18, 2014

(51) Int. Cl.
B23K 9/09    (2006.01)
B23K 9/10    (2006.01)
B23K 9/095    (2006.01)

(52) U.S. Cl.
CPC .............. *B23K 9/092* (2013.01); *B23K 9/095* (2013.01); *B23K 9/1006* (2013.01)

(58) Field of Classification Search
CPC .......... B23K 9/09; B23K 9/091; B23K 9/092; B23K 9/095; B23K 9/1006
USPC ...................................... 219/130.51, 137 PS
See application file for complete search history.

(56) References Cited

U.S. PATENT DOCUMENTS

| | | |
|---|---|---|
| 2,365,958 A | 12/1944 | Holslag |
| 2,416,047 A | 2/1947 | Dolan |
| 3,288,982 A | 11/1966 | Haruyoshi |
| 3,725,629 A | 4/1973 | Vickers |
| 3,809,853 A | 5/1974 | Manz |
| 3,849,871 A | 11/1974 | Kaunitz |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |

(Continued)

FOREIGN PATENT DOCUMENTS

| | | |
|---|---|---|
| CA | 2072711 | 12/1992 |
| CN | 2181354 | 11/1994 |

(Continued)

OTHER PUBLICATIONS

International Search Report from PCT application No. PCT/US2014/017864, dated Aug. 22, 2014, 9 pgs.

(Continued)

*Primary Examiner* — Ibrahime A Abraham
*Assistant Examiner* — John J Norton
(74) *Attorney, Agent, or Firm* — McAndrews, Held & Malloy, Ltd.

(57) ABSTRACT

A welding system includes a power source configured to generate power and deliver the power to a welding torch. The power is provided in accordance with an electrode negative pulse welding regime that includes a cyclic peak, followed by a stabilization phase, then a return to a background level. The stabilization phase has a generally parabolic current shape, and is performed in a current-closed loop manner until a transition point, where control becomes voltage-closed loop until the background level is reached. Resulting weld performance is improved, with a globular-like transfer mode, reduced shorts and enhanced arc stability.

16 Claims, 4 Drawing Sheets

(56) References Cited

U.S. PATENT DOCUMENTS

| | | |
|---|---|---|
| 4,426,565 A | 1/1984 | Rueter |
| 4,447,703 A | 5/1984 | Stol |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,580,026 A | 4/1986 | Stol |
| 4,628,182 A | 12/1986 | Hori |
| 4,631,385 A | 12/1986 | Rothermel |
| 4,667,083 A | 5/1987 | Stol |
| 4,728,761 A | 3/1988 | Mucha |
| 4,950,348 A | 8/1990 | Larsen |
| 4,973,821 A | 11/1990 | Martin |
| 5,001,326 A | 3/1991 | Stava |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,526,561 A | 6/1996 | McGaffigan |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn |
| 5,773,799 A | 6/1998 | Maxfield |
| 5,783,799 A | 7/1998 | Geissler |
| 5,844,193 A | 12/1998 | Nomura |
| 5,963,022 A | 10/1999 | Buda |
| 5,968,587 A | 10/1999 | Frankel |
| 6,008,470 A | 12/1999 | Zhang |
| 6,015,964 A | 1/2000 | Baker |
| 6,043,471 A | 3/2000 | Wiseman |
| 6,051,810 A | 4/2000 | Stava |
| 6,090,067 A | 7/2000 | Carter |
| 6,107,602 A | 8/2000 | Geissler |
| 6,115,273 A | 9/2000 | Geissler |
| 6,169,263 B1 | 1/2001 | Derby |
| 6,204,476 B1 | 3/2001 | Reynolds |
| 6,248,976 B1 | 6/2001 | Blankenship |
| 6,265,688 B1 | 7/2001 | Lyshkow |
| 6,278,074 B1 | 8/2001 | Morlock |
| 6,292,715 B1 | 9/2001 | Rongo |
| 6,331,694 B1* | 12/2001 | Blankenship ........... 219/137 PS |
| 6,359,258 B1 | 3/2002 | Blankenship |
| 6,479,792 B1 | 11/2002 | Beiermann |
| 6,486,439 B1 | 11/2002 | Spear |
| 6,515,259 B1 | 2/2003 | Hsu |
| 6,583,386 B1 | 6/2003 | Ivkovich |
| 6,596,970 B2 | 7/2003 | Blankenship |
| 6,624,388 B1 | 9/2003 | Blankenship |
| 6,642,482 B2 | 11/2003 | Rappl |
| 6,670,579 B2 | 12/2003 | Davidson |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,984,806 B2 | 1/2006 | Huismann |
| 6,995,338 B2 | 2/2006 | Hutchison |
| 7,002,103 B2 | 2/2006 | Holverson |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,307,240 B2 | 12/2007 | Holverson |
| 7,351,933 B2 | 4/2008 | Huismann |
| 8,203,100 B2 | 6/2012 | Ueda |
| 8,288,686 B2 | 10/2012 | Kaufman |
| 8,487,215 B2 | 7/2013 | Holverson |
| 9,403,231 B2 | 8/2016 | Hutchison |
| 9,539,662 B2 | 1/2017 | Hutchison |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0184039 A1 | 8/2005 | Stava |
| 2005/0269306 A1 | 12/2005 | Fulmer |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0173726 A1 | 7/2009 | Davidson |
| 2010/0059493 A1 | 3/2010 | McAninch |
| 2010/0096373 A1 | 4/2010 | Hillen |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1* | 5/2011 | Peters ............. B23K 9/09 |
| | | 219/73.2 |
| 2011/0114612 A1 | 5/2011 | Holverson |
| 2011/0163080 A1 | 7/2011 | Beck |
| 2011/0204034 A1 | 8/2011 | Schartner |
| 2011/0248007 A1 | 10/2011 | Takeda |
| 2012/0024828 A1 | 2/2012 | Oowaki |
| 2012/0061362 A1 | 3/2012 | Davidson |
| 2012/0074112 A1 | 3/2012 | Kotera |
| 2012/0248080 A1 | 10/2012 | Hutchison |
| 2012/0291172 A1 | 11/2012 | Wills |
| 2012/0298642 A1* | 11/2012 | Lambert ............ B23K 9/0673 |
| | | 219/130.21 |
| 2013/0112674 A1 | 5/2013 | Mnich |
| 2013/0112676 A1 | 5/2013 | Hutchison |
| 2013/0270245 A1 | 10/2013 | Holverson |
| 2014/0021183 A1 | 1/2014 | Peters |
| 2014/0131320 A1* | 5/2014 | Hearn ............... B23K 9/092 |
| | | 219/74 |
| 2014/0158669 A1 | 6/2014 | Davidson |
| 2014/0183176 A1 | 7/2014 | Hutchison |
| 2014/0251971 A1* | 9/2014 | Hearn et al. ............ 219/130.51 |
| 2014/0263237 A1* | 9/2014 | Daniel ................ B23K 9/0953 |
| | | 219/130.21 |
| 2014/0263241 A1 | 9/2014 | Henry |

(56) References Cited

U.S. PATENT DOCUMENTS

2015/0105898 A1 4/2015 Adams
2016/0318112 A1 11/2016 Hutchison

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| DE | 2501928 | 7/1976 |
| DE | 19808383 | 9/1999 |
| EP | 0194045 | 9/1986 |
| EP | 0387223 | 9/1990 |
| EP | 1232825 | 8/2002 |
| EP | 2218537 | 8/2010 |
| EP | 2286949 | 2/2011 |
| FR | 1443701 | 6/1966 |
| JP | S5719166 | 2/1982 |
| JP | S57109573 | 7/1982 |
| JP | S60108175 | 6/1985 |
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 20060043288 | 5/2006 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |

OTHER PUBLICATIONS

International Search Report from PCT application No. PCT/US2014/041201, dated Nov. 4, 2014, 11 pg.
International Search Report from PCT application No. PCT/US2015/045715, dated Jan. 7, 2016, 12 pgs.
"ALT 304," Miller—The Power of Blue, Jun. 2001.
"Maxstar 200 SD, DX, and LX," Miller Electric Mfg. Co., Oct. 2003.
Bondy et al., "Graph Theory with Appliations," University of Waterloo, 1976, p. 7-8.
Examiner Requisition Canadian Appln No. 2,955,970 dated Sep. 13, 2018 (4 pgs.).

* cited by examiner

ELECTRODE NEGATIVE PULSE WELDING SYSTEM AND METHOD

BACKGROUND

The invention relates generally to welding processes, and more specifically, to methods and systems for controlling electrode transfer in pulsed spray gas metal arc welding (GMAW-P) processes.

Welding is a process that has become ubiquitous in various industries, and may be used to facilitate many metal construction and assembly applications. For example, one process commonly known as gas metal arc welding (GMAW) is most generally a specific welding process that uses a welding arc between a continuous filler metal electrode and a workpiece. Certain GMAW derivation processes or transfer modes such as spray transfer and pulsed spray transfer (e.g., GMAW-P) may include relatively high voltage levels, high amperage levels, and high wire feed speed (WFS) to transfer droplets of the metal electrode material across the welding arc onto relatively thin metals workpieces. Unfortunately, when using an electrode negative polarity welding arc, the metal electrode may be reluctant to transfer material across the welding arc.

Thus, while it would be advantageous in many applications to utilize a pulsed electrode negative welding regime, conventional techniques would add too much energy to the weld, create bridging shorts and inconsistent metal transfer, erratic arc length, and may result in unwanted spatter. Improvements in the field that would permit such waveforms to be utilized while improving welding performance would be an advance in the art.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Welding processes have become ubiquitous in various industries, and may be used to facilitate metal construction and assembly applications. GMAW is most generally a specific welding process that uses a welding arc between a continuous filler metal electrode and a workpiece. Certain GMAW derived processes or transfer modes such as spray transfer and pulsed spray transfer (GMAW-P) may include relatively high voltage levels, high amperage levels, and high wire feed speed (WFS) to transfer droplets of the metal electrode material across the welding arc to perform welding tasks on relatively thin metals workpieces. Unfortunately, when using an electrode negative polarity welding arc, the metal electrode may be reluctant to transfer material across the welding arc.

Accordingly, present embodiments relate to systems and methods useful in adjusting one or more characteristics of voltage and amperage output levels to improve transfer metal electrode across a DCEN pulsing welding arc, as well as arc stability. Specifically, reducing the falling edge transition of each peak pulse in a pulse welding regime creates a "stabilization phase" between the peak and a background phase, allowing sufficient time and slow responsiveness at a current-closed loop output for deposition to settle while avoiding or reducing the change for a "hard short" that requires clearing. In prior techniques, aggressive current control following the peak phase tended to cause rapid voltage changes, arc instability, spatter, and frequent short circuits. Other characteristics of the voltage and amperage output levels such as pulse frequency, background period, and pulse width may also be adjusted to improve arc control. As used herein, "stabilization phase" may refer to control of current (and voltage) following a peak phase of a pulse welding regime, prior to transition to a phase in which voltages (and currents) return to a background level. The stabilization phase will typically be used and with DC electrode negative pulse welding techniques, and may characterized by a parabolic, current-closed loop decline in welding power output. The stabilization phase may be terminated at a higher programmed current than in conventional pulse welding regimes. Then, in a "return to background" phase following the stabilization phase, a proportional-only gain is used for the voltage-closed loop control. It should be appreciated, however, that the techniques described herein may not be limited to spray transfer and pulsed spray transfer GMAW processes, but may also be extended to other GMAW processes. Indeed, as discussed below, rather than a spray-type transfer, the stabilization phase tends to promote a more globular transfer of filler metal to the weld puddle, particularly when used with an EN polarity.

Figure 1:
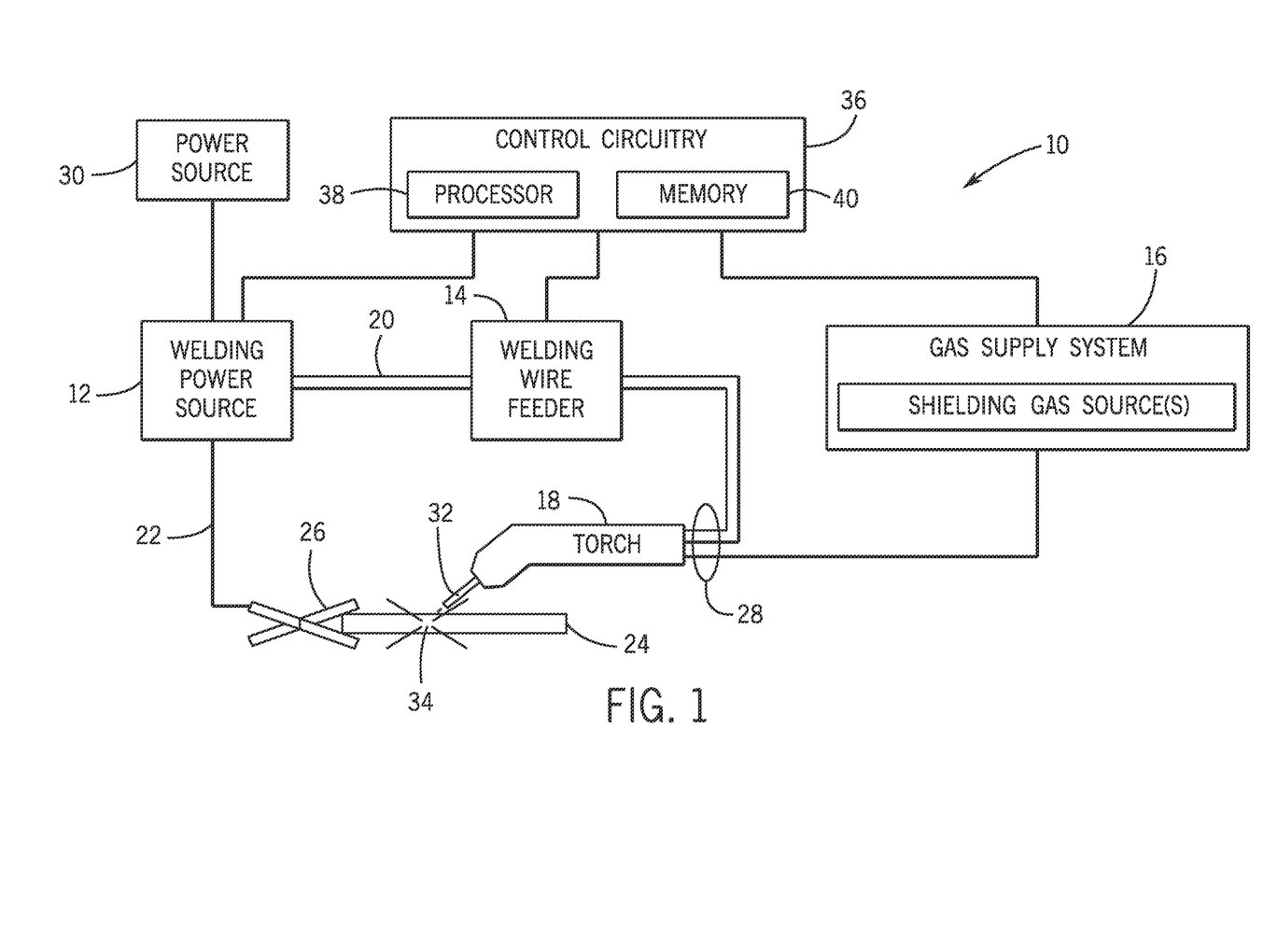
FIG. 1 is a block diagram of an exemplary GMAW system in accordance with the present disclosure.

With the foregoing in mind, it may be useful to describe an embodiment of an welding system, such as an exemplary GMAW system 10 illustrated in FIG. 1. The system illustrated may be typical for an automated or semi-automated (e.g., robotic) welding system, although the arrangement illustrated may be altered in many ways, and the techniques may also be used in hand-held welding processes. As illustrated, the welding system 10 may include a welding power source 12, a welding wire feeder 14, a gas supply system 16, and a welding torch 18. The welding power source 12 may generally supply welding power for the welding system 10. For example, the power source 12 may couple to the welding wire feeder 14 via a power cable 20, as well as to via a lead cable 22 to a workpiece 24, such as through a clamp 26. In the illustrated embodiment, the welding wire feeder 14 is coupled to the welding torch 18 via a weld cable 28 in order to supply, for example, a metal cored welding electrode and power to the welding torch 18 during operation of the welding system 10. In some arrangements, the wire feeder may be incorporated into the power source. Gas from the gas supply system 16 is also typically routed through the weld cable 28. Regarding the workpiece, it is believed that the present techniques may be particularly well suited to workpieces comprising relatively thin gauge galvanized (or coated) steels, although other materials and sizes of materials may be welded as disclosed. Moreover, various travel speeds may be accommodated by manual, or more typically robotic movement of the torch, the workpiece, or both, such as travel speeds of at least 30 in/min, although other speeds may be utilized as well.

The welding power source 12 may further generally include power conversion circuitry (not separately shown) that receives input power from a power source 30 (e.g., an AC power grid, an engine/generator set, or a combination thereof), conditions the input power, and provides DC or AC output power for welding. The welding power source 12 will also include output terminals for providing welding power output, and these may allow for connection in accordance with either positive or negative polarity welding regimes. Specifically, the welding power source 12 may power the welding wire feeder 14, and by extension, the welding torch 18 in accordance with demands of the welding system 10. In certain embodiments contemplated by this disclosure, the welding torch 18 may be coupled to the power supply and wire feeder to implement an EN welding regime, and in particular, a pulse welding process. That is, the power source 12 may be useful in providing a DCEN output, in which the electrical current flows through the completed circuit from the negative to positive direction, and thus affects the welding arc and/or welding process. In addition to a DCEN output, the power source 12 may also include circuit elements (e.g., transformers, rectifiers, switches, and so forth) capable of converting the AC input power to a direct current electrode positive (DCEP) output, DC variable polarity, pulsed DC, or a variable balance (e.g., balanced or unbalanced) AC output to perform one or more welding processes.

For GMAW embodiments, the welding system 10 also includes the gas supply system 16 to supply a shielding gas or shielding gas mixtures from one or more shielding gas sources to the welding torch 18. The shielding gas may be any gas or mixture of gases that may be provided to the welding arc and/or weld pool in order to provide a particular local atmosphere (e.g., to shield the welding arc, improve arc stability, limit the formation of metal oxides, improve wetting of the metal surfaces, alter the chemistry of the weld deposit, and so forth). For example, the shielding gas may comprise one or a mixture of argon (Ar), helium (He), carbon dioxide ($C_{O2}$), oxygen ($_{O2}$), and nitrogen ($_{N2}$).

Accordingly, as previously noted, the welding torch 18 generally receives the metal welding electrode from the welding wire feeder 14, and a shielding gas flow from the gas supply system 16 in order to perform a welding operation on the workpiece 24. During operation, the welding torch 18 may be brought near the workpiece 22, such that the welding electrode 32 approaches the workpiece and a welding arc 34 is established. It is further believed that the present techniques may be particularly useful with particular types of electrode wires. For example, the electrode 34 may be a metal cored welding wire suitable for use with a DCEN welding polarity. In such cases, the electrode will include a sheath consisting of metal encircling one or more metal cores. The welding electrode may also include fluxing or alloying components that may act as arc stabilizers and, further, may become at least partially incorporated into the weld. One metal cored welding wire useful for DCEN pulse welding in accordance with the present techniques is disclosed in U.S. patent application Ser. No. 13/743,178, entitled Systems and Methods for Welding Electrodes, filed on Jan. 16, 2013, by Barhorst et al., which is hereby incorporated into the present disclosure by reference.

In certain embodiments, the welding power source 12, the welding wire feeder 14, and the gas supply system 16 may each be controlled and commanded by a control circuitry 36. The control circuitry 36 will include one or more processors 38 and cooperating data processing and sensing circuitry that may be communicatively coupled to a memory 40 to execute instructions stored in the memory for carrying out the presently disclosed techniques. These instructions may be encoded in programs or code stored in tangible non-transitory computer-readable medium, such as the memory 40 and/or other storage. The pulse welding techniques will typically be pre-programmed for specific wire types and sizes, and the particular process desired may be selected by a welding operator via an interface (not separately shown). The processor 38 may be a general purpose processor, system-on-chip (SoC) device, application-specific integrated circuit (ASIC), or other processor configuration. The processor 38 may also support an operating system capable of supporting applications such as, for example, Pro-Pulse™, Accu-Pulse™, Accu-Curve™, and Profile Pulse™ available from Illinois Tool Works, Inc. Similarly, the memory 40 may include, for example, random-access memory (RAM), read-only memory (ROM), flash memory (e.g., NAND), and so forth. As will be further appreciated, in one embodiment, the memory 40 of the control circuitry 36 may be flash updated (e.g., via wired and/or wireless data transmission, programming, and so forth) to include instructions to vary one or more parameter characteristics of the welding output power, and by extension, the welding arc 34. It should be noted that in many configurations, separate processing and control circuitry may be provided for the power supply and for the wire feeder. The power supply typically performs the processing of the control signals used to control power electronic devices (e.g., SCRs, IGBTs, etc.) for producing desired output. In presently contemplated embodiments, code defining the DCEN pulse welding process utilizing a stabilization phase is stored in the memory 40 and executed by processing circuitry in the power supply.

As noted above, components of the control circuitry 36 is communicatively coupled to (or embedded within) the welding power source 12, the welding wire feeder 14, and gas supply system 16, and, as noted provides control of one or more parameters (e.g., voltage and amperage output, wire feed speed, travel speed for automated applications, etc.) associated with each of the aforementioned components.

Figure 2:
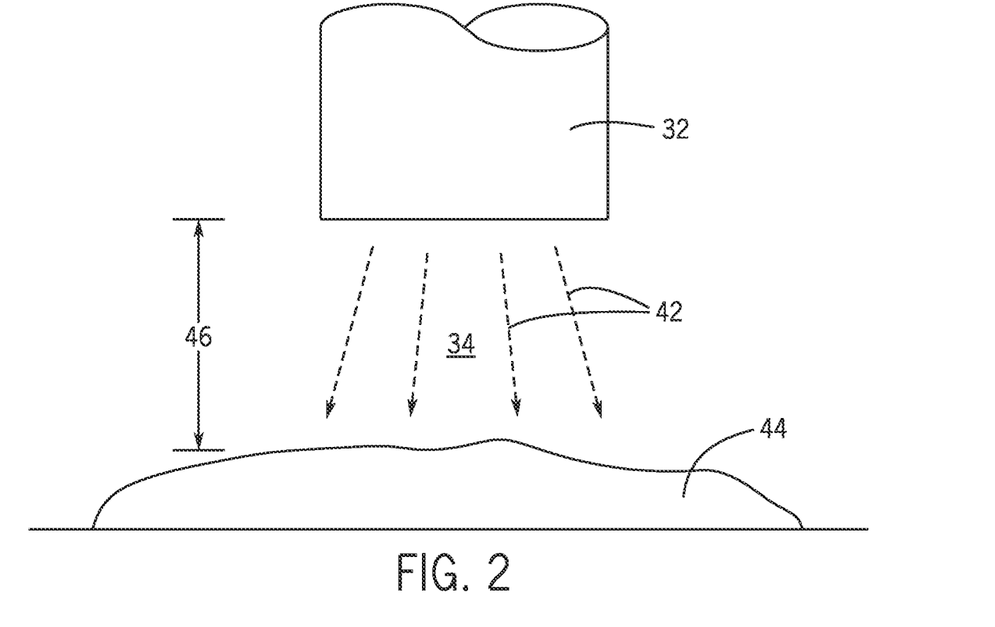
FIG. 2 is an exemplary elevational view of the welding electrode of the GMAW system of FIG. 1 using a direct current electrode negative (DCEN) polarity in an improved pulse welding process.
Figure 3:
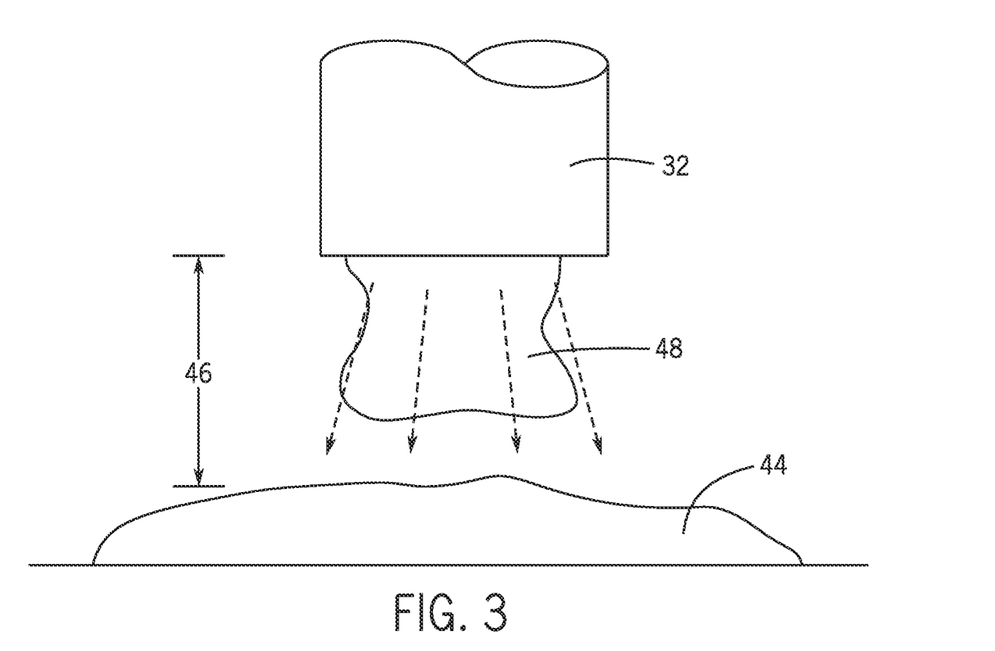
FIG. 3 is an exemplary elevational view of the electrode shown in FIG. 2 illustrating material transfer during a peak phase of the pulse welding process.

FIG. 2 depicts an embodiment of a welding process using a DCEN polarity electrical welding arc 34. As previously noted, the welding electrode 32, once energized and positioned near the workpiece establishes an electrical welding arc 34 to perform a weld of the workpiece 22. Specifically, when using a DCEN polarity welding arc 34, heating will particularly take place in the wire electrode, resulting in less penetration than with DCEP processes. In such processes, the electrode is designated as "negative", while the workpiece is "positive". Electron flow, indicated by arrows 42 is from the electrode 32 to the workpiece, and primarily to the weld puddle 44. Such techniques are sometimes referred to as "straight polarity". In general, an arc length 46 is maintained between the tip of the electrode and the weld puddle 44. This arc length may be determined to some degree, and in many respects controlled by the power input to the electrode, and therethrough to the arc, the weld puddle, and the workpiece. While in many prior art techniques efforts are made to rigorously control the arc length, the present technique, through use of the stabilization phase following pulse peaks, tends to emphasize arc stability over strict control of the arc length.

Moreover, in conventional GMAW-P processes, transfer of metal from the electrode tends to be in a spray mode. In these techniques, the welding power supply pulses the welding output with high peak currents set at levels that create spray transfer, and low background current levels that maintain the arc, but that are too low for any metal transfer to occur. Because the metal transfer during the background phase of the cycle, the weld puddle may freeze slightly.

While the present technique may be classified generally as a GMAW-P process, it tends to differ from conventional processes in several important respects. For example, conventional GMAW-P processes control the decline in current levels from the peak based on a linear relationship between current and time (e.g., A/ms). They also tend to close control loops (on current and/or voltage) to more rigorously maintain arc length, and transition to a voltage phase at a current level lower then in the present technique. Moreover, such existing techniques typically use a proportional/integral gain for voltage-closed loop control on the return to background portion of the ramp following the pulse peak. A consequence of these factors is that voltage and currents decline aggressively, which can result in frequent short circuits that may require clearing before the subsequent peak.

Figure 4:
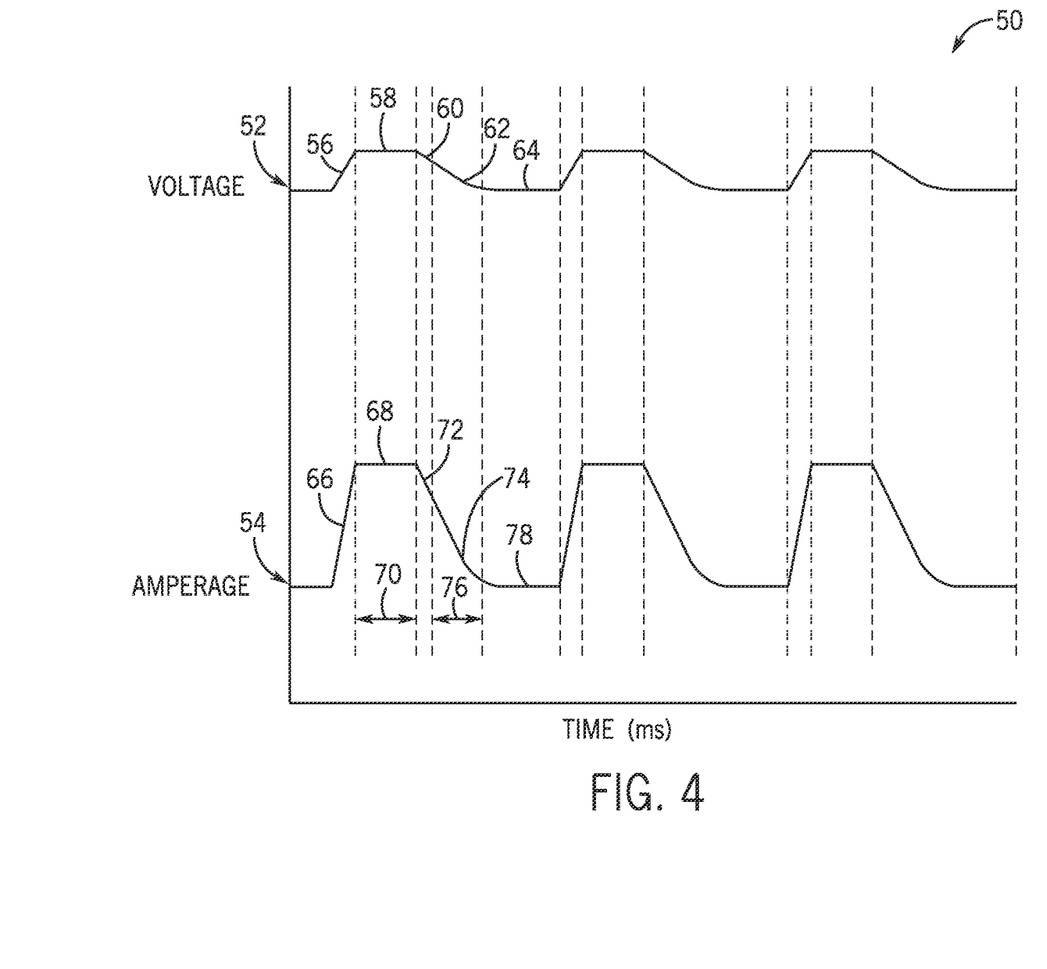
FIG. 4 is an exemplary timing diagram of the pulse welding process voltage and amperage waveforms.

The present technique, particularly when used with EN polarities, generates a "softer" down ramp, emphasizing arc stability and avoiding or reducing the risk of short circuits. Moreover, as illustrated in FIG. 4, the transfer mode tends to be more globular then conventional GMAW-P processes. While transfer occurs during the peak phase, material continues to be melted from the electrode thereafter, and one or more globules 48 tends to remain near or somewhat suspended between the electrode and the weld puddle. The arc length 46 may change, or may be difficult to rigidly qualify, although short circuits, and particularly "hard shorts" are typically avoided and the arc tends to be more stable.

Here again, while the waveform may be used with electrode positive polarities, it is believed to be particularly useful when welding with electrode negative polarities and processes. For control, the power supply control circuitry may regulate the power output by cyclically transitioning between voltage-closed loop control and current-closed loop control. During the time the welding power output is low (e.g., during a background phase of the pulsed waveform), the welding arc remains established, but will add little energy to the electrode and workpiece, although heating of the electrode and weld puddle will continue. During this background phase, the electrode and pool are allowed to cool somewhat, and between the peak phase and the background phase a stabilization phase is implemented as discussed more fully below. Again, the majority of metal transferred from the electrode will be transferred during the peak phase of each pulse. This stabilization phase that follows each peak phase reduces weld puddle instability and spatter, reduces the energy input to the weld (at least in part by avoiding "hard shorts", mitigates porosity, and reduces "burn through" of the workpiece.

FIG. 4 shows an exemplary DCEN pulsed welding process 50 illustrated in terms of an exemplary voltage trace 52 and current trace 54 over several sequential cycles of pulsed welding. During each cycle, a voltage ramp 56 is the leading edge of a voltage peak 58, followed by a stabilization phase down ramp 60, which is current-closed loop, and a voltage-closed loop ramp 62 back to a background voltage level 64. Corresponding phases may be seen in the current waveform 54. That is, a current-closed loop ramp 66 is implemented rising to the voltage-closed loop controlled peak 68. During the peak, the controller may vary the current to maintain the voltage at the desired level. In practice, a desired voltage command is issued during the peak phase, although the actual voltage may vary based on the dynamics of the arc, occasional shorts that may occur, and so forth. Thereafter, a current-closed loop, generally parabolic stabilization phase ramp 72 drives the current down to a transition to a voltage-closed loop controlled ramp 74 to return to the background level 78. The same cycle is then repeated throughout the welding operation.

By way of example, in one embodiment, the rising edge portion 66 of the current waveform 54 may be controlled at a ramp rate of approximately 600 A/ms. Upon achieving peak amperage 68, the control circuitry will maintain a desired voltage peak, such as approximately 200 V during a peak period 70. The generally parabolic stabilization phase 72 of current-closed loop control will then be implemented during a time 76 until the current has reached a programmed transition point. Here, and throughout the present disclosure, it should be borne in mind that the particular voltages, currents, ramp rates, and so forth will typically be programmed ("trained") in advance, optimized for particular wires and wire sizes, and so forth. Moreover, in some systems, some degree of operator or programmer control of the parameters may be provided.

Figure 5:
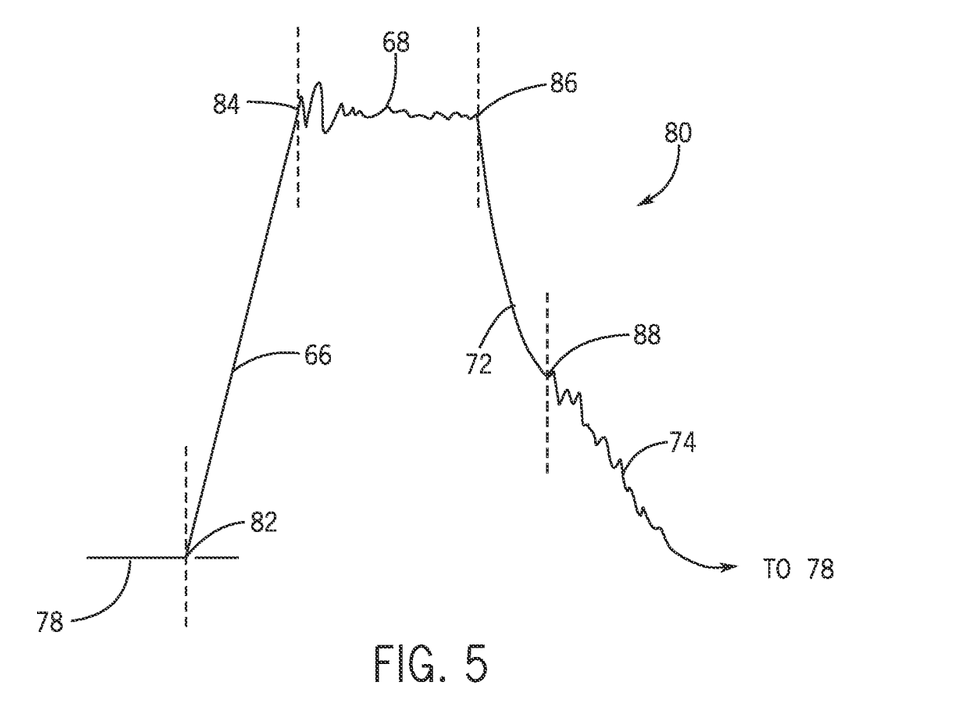
FIG. 5 is a detailed graphical representation of certain phases of the pulsed welding process.

FIG. 5 illustrates the peak, stabilization, and return phases of the current waveform in somewhat greater detail. As shown, the current peak 80 begins at a background level 78. At transition point 82, then, a linear ramp 66 is initiated, such as at a rate of between 450 and 650 A/ms to a peak current transition point 84, such as between 210 and 400 A. Of course these ranges are exemplary only, and will typically be different for different wire sizes and wire feed speeds. In a presently contemplated embodiment, the transition at this point may actually occur based on one of two considerations. That is, the current may reach a programmed level, as mentioned, or the voltage may reach a programmed peak value before the current reaches that level, resulting in a transition before the current limit is reached. Thereafter, during the peak phase, the current "floats" to maintain the voltage at a desired level in a voltage-closed loop manner. Following the period for this peak, as indicated by transition point 86, the stabilization phase begins that includes a decline in the current through current-closed loop control.

The generally parabolic shape of the current waveform during the stabilization phase results from implementation of a current-per-unit-time-squared ($i/t^2$) relationship during the ramped decline in current. Once the current reaches a transition point 88, such as between 25 and 325 A, control again transitions to voltage-closed loop control, and the current waveform will exhibit a shape resulting from the control attempting to maintain the desired voltage decline to the background level. It should be noted, however, that the transition point for exiting the stabilization phase may vary for different wire sizes and ratings, and may be programmable within one or more ranges. For example, for 0.045" wires, the exit point may be programmed between 100 and 325 A; for 0.040" wire it may be programmed between 50 and 275 A; and for 0.035" wire it may be programmed between 25 and 225 A. The programmed value tends to be roughly 25 to 50 A higher than current-control-to-voltage-control transitions in peak down ramps in existing pulse welding regimes (and where the current begins to regulate during the return to background levels under voltage-closed loop control). Moreover, in a currently contemplated implementation, the gain applied during this "return" phase of voltage-closed loop control is, in a presently contemplated embodiment, proportional only (although other gain relationships may be used). It is believed that the combination of the parabolic stabilization phase, the earlier exit point, and the use of a proportional-only gain for the return to background levels, separately and/or together, produce better control of arc stability (prioritized over arc length), and result in less frequent shorts, and the tendency to avoid "hard shorts".

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a power source configured to generate welding power and deliver the welding power to a welding torch, wherein the welding torch is coupled to a negative output terminal of the power source;
a welding wire feeder configured to advance a metal cored electrode into the welding torch at a rate of advancement; and
control circuitry configured to implement an electrode negative pulse welding process comprising voltage-closed loop control of the welding power during a peak phase, a transition from the voltage-closed loop control of the welding power during the peak phase to parabolic current-closed loop control of the welding power during a stabilization phase following the peak phase, and a transition from the parabolic current-closed loop control of the welding power during the stabilization phase to voltage-closed loop control of the welding power during a return phase following the stabilization phase, wherein the electrode negative pulse welding process maintains a voltage output at a desired level and allows the current output to float during voltage-closed loop control.

2. The welding system of claim 1, wherein the stabilization phase control circuitry implements parabolic current-closed loop control of the welding power as a down ramp of current based on a ratio of current-per-unit-time-squared.

3. The welding system of claim 1, wherein the return phase comprises a proportional-only gain on a welding voltage.

4. The welding system of claim 1, wherein a leading edge of the peak phase comprises a linear current-closed loop controlled ramp to a pre-determined transition point.

5. The welding system of claim 1, wherein a voltage command of the welding power during the peak phase is between 18 and 28 V.

6. The welding system of claim 1, wherein the transition between the stabilization phase and the return phase is programmable between 25 and 325 A.

7. The welding system of claim 6, wherein the transition between the stabilization phase and the return phase is above 50 A.

8. The welding system of claim 6, wherein the transition between the stabilization phase and the return phase is above 100 A.

9. The welding system of claim 1, wherein the electrode negative pulse welding process produces a globular transfer of molten metal from the electrode to a weld puddle.

10. A welding system, comprising:
a power source configured to generate welding power and deliver the welding power to a welding torch;
a welding wire feeder configured to advance an electrode into the welding torch; and
control circuitry configured to implement an electrode negative pulse welding process by cyclically transitioning between voltage-closed loop control and current-closed loop control, the process comprising
regulating the power supply in voltage-closed loop control during a peak phase;
transitioning from the voltage-closed loop control of the welding power during the peak phase to parabolic current-closed loop control of the welding power during a stabilization phase following the peak phase; and
transitioning from the parabolic current-closed loop control of the welding power during the stabilization phase to voltage-closed loop control of the welding power during a return phase following the stabilization phase, wherein the process maintains a voltage output at a desired level and allows the current output to float during voltage-closed loop control.

11. The welding system of claim 10, wherein the stabilization phase comprises a down ramp of current defined by a current-per-unit-time-squared relationship.

12. The welding system of claim 10, wherein the voltage-closed loop return phase comprises a proportional only gain on voltage.

13. The welding system of claim 10, wherein the electrode is a metal cored welding wire electrode.

14. The welding system of claim 10, wherein a voltage command of the welding power during the peak phase is between 18 and 28 v.

15. The welding system of claim 10, wherein a transition between the stabilization phase and the voltage-closed loop return is programmable between 25 and 325 A.

16. The welding system of claim 10, wherein the welding process produces a globular transfer of molten metal from the electrode to a weld puddle.

* * * * *